May 3, 1960 W. T. CAMPE ET AL 2,935,653
MOUNTING ARRANGEMENT FOR ELECTRICAL DEVICE
Filed April 30, 1958

INVENTOR.
WILLIAM T. CAMPE
ROBERT A. HEINRICH
BY
ATTORNEY

United States Patent Office 2,935,653
Patented May 3, 1960

2,935,653
MOUNTING ARRANGEMENT FOR ELECTRICAL DEVICE

William T. Campe, Crystal Lake, Ill., and Robert A. Heinrich, Maple Glen, Pa., assignors to Minneapolis-Honeywell Regulator Company, Minneapolis, Minn., a corporation of Delaware Application April 30, 1958, Serial No. 732,041

11 Claims. (Cl. 317—99)

The present invention is directed to a mounting arrangement for an electrical device, such as a switch or signal means, wherein the device can be readily mounted or affixed to a mounting panel without the need of screw fasteners or similar fastening means being associated with the device per se. Further, the mounting arrangement of the present invention requires a minimum amount of mounting hardware, both as to the number of elements utilized and the mass of the elements, located to the front of the panel whereupon the device is mounted. Also, the present invention is directed to a multiple or gang mounting arrangement for electrical devices, wherein the devices can be disposed through a single slot or opening in a mounting panel and whereby the devices can be mounted adjacent each other on minimum centers. The multiple or gang mounting arrangement includes means disposed between the devices which: limits the possibility of manual error in actuating the devices if the devices are switches; and reduces the optical interaction between adjacent devices if the devices include signal or illumination means, the light of which is arranged to be transmitted through light transmitting means located forward of the mounting panel.

Generally speaking, it is desirable to be able to mount an electrical device to a panel with a minimum amount of mounting hardware and with a minimum amount of effort. In some applications, it is desirable that no screw fasteners or similar fastening means be associated with the electrical devices per se. Especially is this true where the electrical devices are of an odd shape and are not readily accommodated by conventional screw fasteners or similar fastening means. Also, in some applications, such as computer panels, it is desirable that electrical devices, such as switches or signal means be arranged as close as possible to each other so as to more efficiently utilize as much of the panel mounting space as possible. Of course, problems arise when it is necessary to arrange electrical devices in close proximity to each other. Thus, the possibility of manual error in actuating adjacent switch devices must be minimized, as must the possibility of optical interaction between adjacent devices including illumination means.

The present invention discloses an arrangement which meets all of the foregoing requirements. As disclosed herein, a mounting arrangement for an electrical device is provided wherein a casing or housing including electrical means associated therewith is arranged so that an end surface thereof abuts a first surface of a mounting panel and so that a member such as a switch actuator or a light transmitting member, associated with the casing, is disposed through a complementary opening in the panel. Further, a pair of mounting members is operatively associated with the casing and the mounting panel. A first portion of each of the mounting members abuts a second surface of the mounting panel, while second portions of the mounting member, which are arranged adjacent the casing, have associated therewith positioning means which engage a portion of the casing. The positioning means when properly located with respect to the casing, maintain the casing as a prisoner between the panel and the positioning means. Such an arrangement for mounting electrical devices to a panel eliminates the need for screw fasteners or similar fastening means to be associated with the devices per se. Further, the mounting arrangement as applied to a single device can also be applied to a plurality of devices, so that members such as switch actuators or light transmitting members, associated with the casings, can all be disposed through a single slot or opening in a mounting panel and so arranged to be adjacent each other. With such an arrangement, a common mounting member disposed between the adjacent devices as well as a mounting member disposed adjacent the extremity of each device so as to straddle the common mounting member along with positioning means can be utilized to maintain the casings of each device as a prisoner between the mounting panel and the positioning means, thereby permitting adjacent devices to be mounted on minimum centers. Portions of the mounting members are arranged to extend forward of the panel to such an extent with respect to the actuators of the devices, if they are switches, or the light transmitting members of the devices, if they are illuminating means, so as to act as barriers between the adjacent devices, thereby reducing the possibility of manual error in actuation or optical interaction therebetween.

It is therefore an object of this invention to provide a mounting arrangement for an electrical device which can be accommodated through a single opening in a mounting panel with a minimum amount of mounting hardware being required;

It is another object of this invention to provide a mounting arrangement for an electrical device which requires no screw fasteners or similar fastening means to be directly associated therewith;

It is a further object of this invention to provide a mounting arrangement for a plurality of electrical devices which can be arranged on minimum centers and which can be accommodated through a single slot or opening in a mounting panel;

It is still a further object of this invention to provide a mounting arrangement for a plurality of electrical devices, such as switches or signals in the form of illumination means, wherein portions of the mounting members utilized for supporting the device extend forward of the mounting panel to such an extent as to reduce the possibility of manual error in actuation or optical interaction, as the case may be, between adjacent devices.

These and other objects will become more apparent from a reading of the following specification and appended claims in which:

Figure 1:
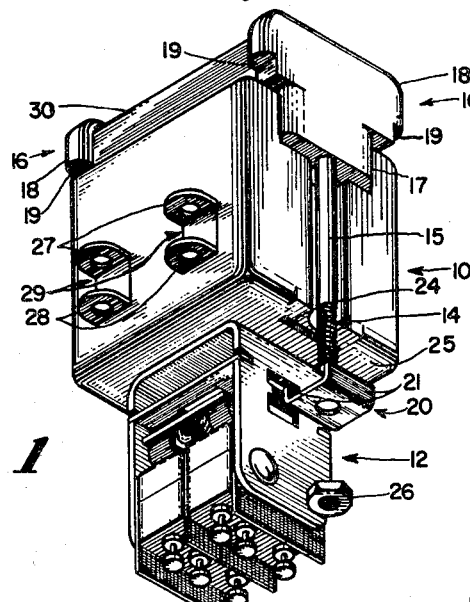
Figure 1 is a perspective view of a push button switch device, including illumination means, having a pair of mounting members, one of which is shown in an exploded form, associated therewith.

The push button switch device shown in Figure 1 is comprised essentially of a casing or housing 10 and switch means 12 operatively fastened thereto. The casing 10 includes a depression 14, disposed in opposite side walls of the casing, only one of which is shown, wherein the spindle portion 15 of a mounting member 16 is arranged to be disposed. Further, the casing 10 includes openings 17, disposed in opposite side walls of the casing, only one of which is shown, for the disposition therein of a part of the barrier portions 18 of mounting members 16. The inclusion of depressions 14 and openings 17 in casing 10 allows for physical contact between respective wall portions of two of the casings should they be placed adjacent each other, inasmuch as the mounting member 16 can be accommodated in the depressions 14 and openings 17 of such adjacent casings. The barrier portions 18 include notches 19 which are arranged to cooperate with a mounting panel, not shown, as will be more fully explained below.

Associated with the mounting members 16 are positioning or clip members 20, only one of which is shown, of generally channel or U-shape, the leg portions 21 of which are arranged to be associated with notches 24, only one of which is shown, located near opposite side walls in the bottom portion 25 of the casing 10. Nuts 26, only one of which is shown, are arranged to be disposed on the threaded extremities of the spindle portions 15 so as to maintain the respective leg portions 21 of the clip members 20 in the respective notches 24 with the push button switch device appropriately arranged with respect to a mounting panel.

Terminals 27 and 28 of illumination means 29 are shown extending from a side wall of the casing. The light supplied by illumination means 29 is arranged to be transmitted from within the casing 10 through a light transmitting switch actuator 30 which is fastened to a yoke member, not shown, located within the casing 10.

Referring now to Figures 2, 3, 4, and 5, a mounting panel 35 is shown having a slot or opening 36 disposed therein. A pair of push button switch devices are associated with the panel 35. Each of the push button switch devices include a casing 10, switch means 12, and switch actuator 30, all mentioned with respect to Figure 1. Further, a mounting member 16 is disposed adjacent the extremity of each push button switch device and a further mounting member 16 is disposed between the push button switch devices. Due to depressions 14 and openings 17 located in the casings, mentioned with respect to Figure 1, the mounting member 16 disposed between the devices can be partly accommodated in the depression and opening of one casing and partly in the depression and opening of the other casing and the casings 10 of the push button switch device can be arranged adjoining each other, thereby keeping center distances therebetween to an absolute minimum.

Figure 5:
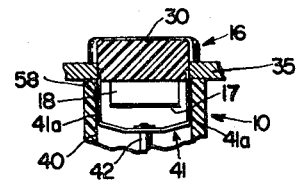
Figure 5 is a partial sectional view of a portion of a switch of Figure 3 taken along the lines 5—5 thereof.
Figure 2:
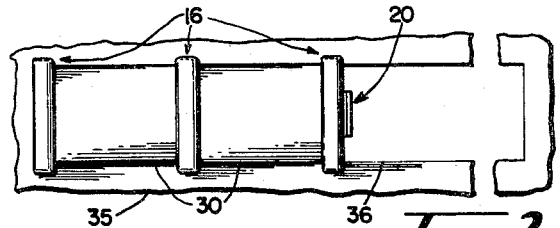
Figure 2 is a view of two switches of the type shown in Figure 1 fastened to a mounting panel through a slot or opening in the panel.
Figure 3:
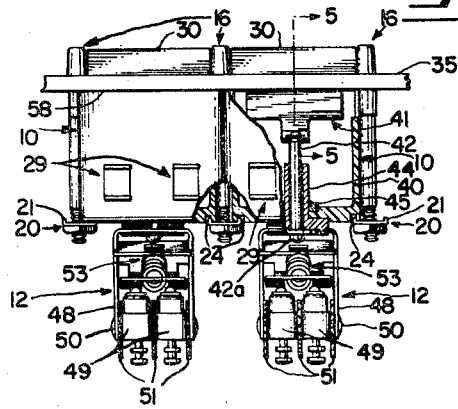
Figure 3 is a front view, in partial section, of the switches shown in Figure 2.

As is best shown in Figure 3, the casings 10 each include a cavity 40 in which a yoke member 41 is located. The yoke member 41 is operatively fastened to a shouldered shaft 42 which is disposed through a sleeve 44 fastened to the casing by an internal tooth lock washer 45. A portion of sleeve 44 is staked over to support switch means housing 48, which includes a pair of snap switches 49 supported therefrom by rivets 50. Insulators 51 are disposed between and on either side of the switches 49. The lower extremity 42a of the shaft 42 is arranged to cooperate with an overcenter toggle mechanism 53 so that upon depression of the switch actuator 30, which actuator is operatively located and maintained between the upright arms 41b of the yoke member 41 due to the inward bias of the arms and which actuator substantially occupies the opening formed by cavity 40, as is best shown in Figure 5, the shaft 42 moves downwardly to cause the over-center action of the mechanism 53.

Figure 4:
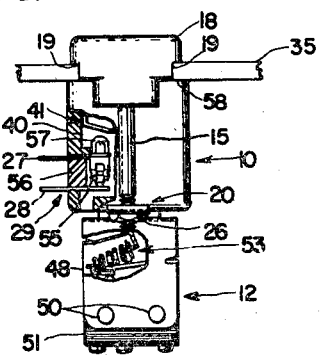
Figure 4 is an end view of the switches shown in Figures 1 and 2.

The illumination means 29 referred to with respect to Figure 1 is best shown in Figure 4 and comprises terminal 27, which includes a socket member 55 associated therewith, and a second terminal 28 both of which are located in the casing 10 in association with a spacer 56. The assembly forming the illumination means 29 is appropriately cemented in place in the casing 10. A lamp 57 is disposed in the socket 55, which lamp can be serviced from the front of the panel 35 by disassociating the switch actuator 30 from the upright arms 41a of the yoke member 41.

With the push button switch devices affixed to panel 35, it can be seen that the notches 19 of the barrier portions 18 of the mounting members 16 are adajacent the upper surface of mounting panel 35, whereas end surface 58 of each casing 10, which is the perimeter surface about the opening provided by cavity 40, abuts the lower surface of the mounting panel 35. The leg portions 21 of the clip members 20 are disposed in the appropriate notches 24 located in the bottom portions 25 of the casings 10. With the nuts 26 drawn up tight, the casings 10 are made prisoners between the mounting panel 35 and the clip members 20. As can be best seen in Figures 4 and 5, with the push button switch devices in place with respect to the panel 35, the lower edges of barrier portions 18 of mounting members 16 are removed a finite distance from the bottom edges of openings 17 of the casings 10. This construction allows the casings 10 to be drawn up and positively held against the panel 35 by means of the mounting members 16, the clip members 20, and the nuts 26.

To disassociate one of a plurality of adjacent push button switch devices from a panel merely requires loosening the nuts 26 disposed on the mounting members 16 straddling the particular device, removing the clip members 20 and withdrawing the device and the appropriate mounting member 16, if any, from the panel. Upon replacing the necessary clip members 20 and nuts 26, and again tightening the nuts, the remaining device or devices are again appropriately mounted to the panel 35.

It will be noted that the barrier portions 18 of the mounting members 16 extend outwardly approximately the same distance from the mounting panel 35 as do the switch actuators 30. With such an arrangement, the possibility of manual error in actuating the push button switch devices is reduced in that the operator's finger cannot easily slip off one switch actuator and engage another during actuation. Similarly, the arrangement of the barrier portions 18 with respect to the light transmitting switch actuators 30 substantially eliminates the possibility of "piping" light from one light transmitting switch actuator to the other.

By utilizing the mounting arrangement set forth above, it will be noted that no screw fasteners or similar fastening means, are associated with the devices per se. Further, the number of mounting elements required to mount the device and the mass of the mounting elements located to the front of the mounting panel is kept to a minimum. Also, the disposition of the devices through a single opening in a mounting panel and the depressions 14 and openings 17 located in the casings 10, as shown in Figure 1, allow for the very close center distances between adjacent devices.

While the disclosure is directed to a mounting arrangement for an illuminated push button switch device, it is obvious that the invention could be applied to other electrical devices. Therefore, the breadth of the present invention should be determined from the following claims, in which,

We claim:

1. In a mounting arrangement for a push button switch, the combination comprising: a casing having switch means associated therewith, said casing including a cavity having switch actuating means located therein; a push button actuator arranged to substantially occupy the opening formed by said cavity and operatively fastened to said switch actuating means, said push button actuator arranged to be disposed through a complementary opening in a mounting panel; the perimeter surface about said cavity arranged to abut a first surface of the mounting panel, said casing including a pair of notches disposed in a portion thereof opposite the opening formed by said cavity so that one each of said notches is located near parallel first and second side walls of said casing; a pair of mounting members each including a barrier portion arranged to span the opening in and to engage a second surface of the mounting panel opposite the first surface engaged by the perimeter surface about said cavity and further including a spindle portion, said mounting members arranged so that the barrier portions are proximate to said push button actuator and said casing and so that the spindle portions are each proximate one of the first and second side walls of said casing; a clip member located on each spindle portion, each clip member having a leg portion disposed in one of the notches of said casing; and fastening means for moving said clip members toward said barrier portions with said casing in place with respect to the mounting panel so that said casing and the mounting panel engage each other thereby positively holding the push button switch in place.

2. In a mounting arrangement for an electrical device, the combination comprising: a casing having electrical means associated therewith; a member proximate an end surface of and operatively affixed to said casing arranged to be disposed through a complementary opening in the mounting panel, an end surface of said casing being arranged to abut a first surface of the mounting panel, said casing including a pair of notches disposed in opposite portions thereof removed from the end surface thereof; barrier means arranged to span the opening in and to engage a second surface of the mounting panel opposite the first surface engaged by said casing, said barrier means having a pair of elements integral therewith, said barrier means and said elements being arranged with respect to said casing so that the barrier means is proximate to said member and said casing and so that said elements are proximate opposite wall portions of said casing; a clip member operatively located on each of said elements, each clip member having an extremity disposed in one of the notches of said casing; and holding means for relatively moving said clip members with respect to said elements and toward said barrier means with said casing in place with respect to the mounting panel so that said casing and the mounting panel engage each other thereby positively holding the electrical device in place.

3. In a mounting arrangement for an electrical device, the combination comprising: a casing having electrical means associated therewith; a member proximate an end surface of and operatively affixed to said casing and arranged to be disposed through a complementary opening in a mounting panel, the end surface of said casing arranged to abut a first surface of the mounting panel; barrier means arranged to span the opening in and to engage a second surface of the mounting panel opposite the first surface engaged by said casing, said barrier means having a pair of elements associated therewith, said barrier means and said elements being arranged with respect to said casing so that the barrier means is proximate to said member and said casing and so that said elements are proximate opposite wall portions of said casing; positioning means associated with said elements, said positioning means having portions thereof operatively associated with said casing, said positioning means arranged to be moved toward said barrier means with said casing in place with respect to said mounting panel, the portions of said positioning means being arranged with respect to said casing so that said casing is a prisoner between said positioning means and the mounting panel with said casing in place with respect to the mounting panel, continued movement of said positioning means toward said barrier means resulting in said casing and the mounting panel engaging each other thereby positively holding the electrical device in place.

4. In a mounting arrangement for an electrical device, the combination comprising: a casing having electrical means associated therewith; a member proximate an end surface of and operatively affixed to said casing and arranged to be disposed through a complementary opening in a mounting panel, the end surface of said casing arranged to abut a first surface of the mounting panel; barrier means arranged to span the opening in and to engage a second surface of the mounting panel opposite the first surface engaged by said casing, said barrier means having a pair of elements associated therewith, said barrier means and said elements being arranged with respect to said casing so that the barrier means is proximate to said member and said casing and so that said elements are proximate opposite wall portions of said casing; means associated with said elements having portions thereof operatively associated with said casing, the portions of said means being arranged with respect to said casing so that said casing is a prisoner between said means and the mounting panel with said casing in place with respect to the mounting panel, thereby positively holding the electrical device in place.

5. In a mounting arrangement for a pair of push button switches, the combination comprising: a pair of casings each having switch means associated therewith, said casings each including a cavity having switch actuating means located therein; a pair of push button actuators each arranged to substantially occupy the opening formed by one of said cavities and operatively fastened to said switch actuating means, said push button actuators arranged to be disposed through a complementary opening in a mounting panel so that said actuators are located adjacent each other; the perimeter surface about each cavity arranged to abut a first surface of the mounting panel; said casings each including a pair of notches disposed in a portion thereof opposite the opening formed by said cavity so that one each of said notches is located near parallel first and second side walls of said casing; three mounting members each including a barrier portion arranged to span the opening in and to engage a second surface of the mounting panel opposite the first surface engaged by the perimeter surface about said cavities and further including a spindle portion, a first of said mounting members being located between said casings and the other mounting members being arranged adjacent said casings straddling said first mounting member so that the barrier portions are proximate to said push button actuator and said casing and so that the spindle portions are proximate the respective side walls of the casings; a clip member located on each spindle portion, the clip member located on said first mounting member having a pair of leg portions one each disposed in one of the notches of said casings, the clip members located on the other mounting members each having a leg portion disposed in one of the notches of one of said casings; and fastening means for moving said clip members toward said barrier portions with said casings in place with respect to the mounting panel so that said casings and the mounting panel engage each other thereby positively holding the push button switches in place; said push button actuators and said barrier portions extending outwardly from the mounting panel a substantially equal distance with the push buttons switches mounted thereto thereby reducing the possibility for error in manual actuation of the push button switches.

6. In a mounting arrangement for a pair of signal devices, the combination comprising: a pair of casings each including a cavity in which illumination means is disposed; a light transmitting member associated with each of said casings to occupy the opening formed by said cavity, said light transmitting members arranged to be disposed through a complementary opening in a mounting panel so that said members are adjacent each other, the perimeter about each cavity surface arranged to abut a first surface of the mounting panel, said casings each including a pair of abutments disposed in opposite portions thereof removed from the perimeter surface; three mounting members each including a barrier portion arranged to span the opening in and to engage a second surface of the mounting panel opposite the first surface engaged by the perimeter surface about said cavities and further including a spindle portion, a first of said mounting members being located between said casings and the other mounting members being arranged adjacent said casings straddling said first mounting member so that the barrier portions are proximate to said light transmitting members and said casings and so that the spindle portions are proximate respective side walls of the casings; a clip member located on each spindle portion, the clip member located on said first mounting member having a pair of leg portions one each associated with one of the abutments of said casings, the clip members located on the other mounting members each having a leg portion associated with one of the abutments of one of said casings, said clip members arranged to be moved toward said barrier portions with said casings in place with respect to the mounting panel so that said casings and the mounting panel engage each other thereby positively holding the signal devices in place; said light transmitting members and said barrier portions extending outwardly from the mounting panel a substantially equal distance with signal devices mounted thereto thereby reducing possibility for light transfer between the light transmitting members.

7. In a mounting arrangement for a pair of electrical devices, the combination comprising: a pair of casings each including electrical means associated therewith; a member operatively affixed to each casing and proximate an end surface thereof, said members arranged to be disposed through a complementary opening in the mounting panel so that said members are adjacent each other, the end surfaces of said casings arranged to abut a first surface of the mounting panel, said casing including a pair of abutments disposed in opposite portions thereof removed from the end surface thereof; three mounting members each including a barrier portion arranged to span the opening in and to engage a second surface of the mounting panel opposite the first surface engaged by said casing and further including an element associated with said barrier portion, a first of said mounting members being located between said casings and the other mounting members being arranged adjacent said casings straddling said first mounting member so that the barrier portions are proximate to said members and so that the barrier portions and the elements are proximate respective side walls of the casings; a clip member located on each element, the clip member located on said first mounting member having a pair of extremities one each associated with one of the abutments of said casings, the clip members located on the other mounting members each having an extremity associated with one of the abutments of one of said casings, said clip members arranged to be moved toward said barrier portions with said casings in place with respect to the mounting panel so that said casings and the mounting panel engage each other thereby positively holding the electrical devices in place.

8. In a mounting arrangement for a pair of electrical devices, the combination comprising: a pair of casings each including electrical means associated therewith; a member operatively affixed to each casing and proximate an end surface thereof, said members arranged to be disposed through a complementary opening in the mounting panel so that said members are adjacent each other, the end surfaces of said casings arranged to abut a first surface of the mounting panel; three mounting members each including a barrier portion arranged to span the opening in and to engage a second surface of the mounting panel opposite the first surface engaged by said casing and further including an element associated with said barrier portion, a first of said mounting members being located between said casings and the other mounting members before arranged adjacent said casings straddling said first mounting members so that the barrier portions are proximate to said members and said casings and so that the elements are proximate respective side walls of the casings; positioning means located on said elements, said positioning means having portions thereof operatively associated with said casings, said positioning means arranged to be moved toward said barrier portions with said casings in place with respect to the mounting panel, the portions of said positioning means being arranged with respect to said casings so that said casings are prisoners between said positioning means and the mounting panel with said casings in place with respect to the mounting panel, continued movement of said positioning means toward said barrier means resulting in said casings and the mounting panel ultimately engaging each other thereby positively holding the electrical devices in place.

9. In a mounting arrangement for a pair of electrical devices, the combination comprising: a pair of casings each including electrical means associated therewith; a member operatively affixed to each casing and proximate an end surface thereof, said members arranged to be disposed through a complementary opening in the mounting panel so that said members are adjacent each other, the end surfaces of said casings arranged to abut a first surface of the mounting panel; mounting means including a mounting member disposed between said casings and comprising a barrier portion arranged to span the opening in and to engage a second surface of the mounting panel opposite the first surface engaged by said casing and further including an element associated with said barrier portion, said mounting means further disposed in the mounting panel so that the barrier portion is proximate to said members and said casings and so that the element is proximate respective side walls of the casings; means associated with said elements having portions thereof operatively associated with said casings, the portions of said means being arranged with respect to said casings so that said casings are prisoners between said means and the mounting panel with said casings in place with respect to the mounting panel, thereby positively holding the electrical devices in place.

10. The combination comprising: a pair of illuminated push button switches each including a casing having illumination means and a light transmitting push button actuator associated therewith, said casings arranged to be disposed side by side in a mounting panel with said light transmitting push button actuators adjacent each other and extending forward of said casings and the mounting panel; and a barrier portion disposed between said light transmitting push button actuators and extending forward of the mounting panel substantially the same distance as said light transmitting push button actuators thereby reducing the possibility for light transfer therebetween and for reducing the possibility for error in manual actuation of the push button switches.

11. The combination comprising: a pair of illuminated push button switches each including a casing having illumination means and a light transmitting push button actuator associated therewith, said casings arranged to be disposed side by side in a mounting panel with said light transmitting push button actuators adjacent each other and extending forward of said casings; and a barrier portion disposed between said light transmitting push button acutators and extending forward of said casings substantially the same distance as said light transmitting push button actuators thereby reducing the possibility for light transfer therebetween and for reducing the possibility for error in manual actuation of the push button switches.

References Cited in the file of this patent

UNITED STATES PATENTS

| | | |
|---|---|---|
| 1,108,999 | Levison | Sept. 1, 1914 |
| 2,038,093 | Wight | Apr. 21, 1936 |
| 2,201,743 | Petersen | May 21, 1940 |
| 2,234,954 | Bergman | Mar. 18, 1941 |
| 2,295,301 | Smith | Sept. 8, 1942 |
| 2,568,933 | Robbins | Sept. 25, 1951 |
| 2,610,237 | Benner | Sept. 9, 1952 |
| 2,748,206 | Andrews | May 20, 1956 |
| 2,816,995 | Harrington | Dec. 17, 1957 |

Disclaimer 2,935,653.—*William T. Campe*, Crystal Lake, Ill., and *Robert A. Heinrich*, Maple Glen, Pa. MOUNTING ARRANGEMENT FOR ELECTRICAL DEVICE. Patent dated May 3, 1960. Disclaimer filed Dec. 10, 1963, by the assignee, *Minneapolis-Honeywell Regulator Company*.

Hereby enters this disclaimer to claims 10 and 11 of said patent.

[*Official Gazette February 18, 1964.*]